United States Patent [19]

Satterly

[11] 3,846,347

[45] Nov. 5, 1974

[54] RIGID FOAMS FROM POLYURETHANE AND METHODS AND COMPOSITIONS FOR USE IN THEIR PREPARATION

[75] Inventor: Kenneth P. Satterly, Kennett Square, Pa.

[73] Assignee: Urtco Chemical Corporation, New York, N.Y.

[22] Filed: Sept. 21, 1970

[21] Appl. No.: 74,216

Related U.S. Application Data

[63] Continuation of Ser. No. 683,152, Nov. 15, 1967, abandoned, which is a continuation of Ser. No. 250,505, Jan. 10, 1963, abandoned, which is a continuation-in-part of Ser. No. 783,688, Dec. 30, 1958, abandoned.

[52] U.S. Cl.. 260/2.5 AF, 260/2.5 AP, 260/2.5 AQ, 260/2.5 AS, 260/2.5 AK, 260/2.5 BB, 260/2.5 BD, 260/77.5 AP
[51] Int. Cl............................................. C08g 22/48
[58] Field of Search ... 260/2.5 AF, 2.5 AP, 2.5 AQ, 260/2.5 AS

[56] References Cited
UNITED STATES PATENTS

| | | | |
|---|---|---|---|
| 2,779,689 | 1/1957 | Reis | 117/104 |
| 2,962,183 | 11/1960 | Rill et al. | 220/9 |
| 3,084,177 | 4/1963 | Hostettler et al. | 260/404.5 |
| 3,102,875 | 9/1963 | Heiss | 260/77.5 |
| 3,194,773 | 7/1965 | Hostettler | 260/2.5 |

OTHER PUBLICATIONS

Italian Patent Number 559,499, granted March 21, 1957, translation cited.

*Primary Examiner*—M. J. Welsh
*Attorney, Agent, or Firm*—C. Walter Mortenson

[57] ABSTRACT

A stable, highly branched polyurethane prepolymer which is in liquid form is prepared by the conversion of polyether/polyols having at least four hydroxyl groups to a polyurethane by reaction with an excess of a urethane-forming reactant such as a polyisocyanate. The said excess functions as a solvent for the prepolymer and in this dissolved, stable form the prepolymer can be converted to rigid foams which have K factors of about 0.14 and below 0.22 and which have closed cell contents of about 90 percent, the cells being fine, uniform cells. In the conversion to the foams the prepolymer is reacted with additional polyether/polyol, this being a polymeric hydroxy compound prepared by reacting a compound containing four or more hydroxyl groups with an alkylene oxide, such as propylene oxide. The foaming is effected in the presence of a blowing agent which consists of a volatile, halogenated lower alkane containing chlorine and fluorine atoms. The iscoyanato content of the prepolymer is about 22 percent to about 30 percent and the final polyurethane has its molecular weight made up to an extent of about 65 percent to about 80 percent by the said polymeric hydroxy compound. Since the foaming is effected without the use of water, the nitrogen atoms in the reaction go substantially to form urethane linkages. The polyether/polyol is represented by such materials as the propylene oxide adducts of sorbitol or sucrose while the urethane forming reactant is represented by such a material as toluene diisocyanate and the blowing agent by such a material as monofluorotrichloromethane. The stability of the prepolymers and their liquid form afford ready shipment of the various components for the foams over long distances and storage for substantial time lengths.

25 Claims, No Drawings

RIGID FOAMS FROM POLYURETHANE AND METHODS AND COMPOSITIONS FOR USE IN THEIR PREPARATION

This is a continuation of my copending patent application Ser. No. 683,152, filed on Nov. 15, 1967 now abandoned, which was filed as a continuation of my copending patent application Ser. No. 250,505, filed on Jan. 10, 1963 and now abandoned. The latter application is based on, and by virtue of the addition of another example, is a continuation-in-part of my original application Ser. No. 783,688, which was filed on Dec. 30, 1958, and which was abandoned upon the filing of Ser. No. 250,505.

This invention relates to the preparation of new compositions of matter and methods for making them. More particularly, it relates to polyols having four or more hydroxyls, or more particularly, polyetherpolyols having four or more hydroxyls, polymers therefrom and shaped articles, such as foams, from the polymers.

Polyurethanes are being used in increasing amounts in a large variety of uses. In many of these, as, for example, in light forms, the polyurethanes are fast replacing foam rubber. The foams being produced include flexible and rigid foams. Thus, the foamed products are going into safety padding, insulation materials, clothing, furniture, among other outlets. Despite the fact that foams have been made that are rigid relative to the flexible foams they are insufficiently tough and rigid to do the jobs desired. Here, of course, the desire is to enter polyurethane products into fields never open to other cellular materials because these lack the necessary characteristics. For construction materials, batting, plywood and the like, rubber is unusable, and attempts are constantly being made to produce polyurethanes with suitable rigidity and toughness.

Accordingly, an object of this invention is the provision of new rigid foams. Another object is the provision of new compositions of matter from which rigid foams may be obtained. A still further objective is providing methods for making the new compositions and the new foams. These and other objectives will appear hereafter, and include providing flexible foams and processes for making them also.

The objectives of this invention are accomplished by converting a monomeric compound having at least four hydroxyls to a polymeric hydroxy compound having at least four hydroxyl groups. The resultant polymer is then further polymerized by reaction with a polyfunctional reactant, such as an isocyanate compound, the reaction being between the hydroxy groups and the isocyanato groups to produce urethane linkages in the resultant polymer. This may then be treated with a mono or a polyfunctional material, such as water. In this reaction, a gaseous material, usually carbon dioxide, is expelled and in its escaping from the polymeric mass, a myriad of voids are created resulting in the production of a foam. Alternatively, no additional material, such as water, is added, and foaming is produced using the residual polyfunctional reactants such as water. This leads to products containing a low porosity. An additional, attractive embodiment involves physical foamants. In this method a volatile material is used which, either at room temperature, at temperatures reached in the polymerization or subsequent reactions or at applied temperatures, evaporates and in tending to escape from the polymeric mass causes the production of the very fine, uniform cells characteristic of the products of this invention.

In one process of this invention, the polymeric hydroxy compound is prepared from pentaerythritol by addition of propylene oxide. The resultant polymeric-tetrol is then treated with a diisocyanate such as m-phenylene diisocyanate. The resultant prepolymer is stabilized in well known ways for shipment or storage. Upon use, it is treated with an aqueous solution and poured into the cavity or the vessel in which foaming is desired. In another process of this invention sorbitol is the hydroxy compound which is converted to the polymeric hydroxy compound by addition of propylene oxide, and the resultant polymeric-hexol is then reacted with a diisocyanate as discussed above and hereinafter. Of the various polymeric-hexols of this invention, those from the sugars are preferred.

Thus, the objectives of this invention are accomplished by the provisions of new compositions of matter, these being the polyurethanes or polyurethane-ureas from the polymeric hydroxy ethers and related products. The polymeric, at least tetrahydroxy, compounds are polyalkylene oxides having at least four hydroxyl groups and are made by addition of alkylene oxides, such as propylene oxide, to a polyol having at least four hydroxyls. Thus, for example, from pentaerythritol a polymer containing a plurality of ether linkages and four free hydroxyl groups is made. This polymer, upon being treated with an urethane forming agent, such as a diisocyanate, is converted to a polyurethane. The foam products of this invention are very rigid and have very attractive core densities and compression/deflection values. The shaped products show no apparent shrinkage under a variety of conditions, and in producing the shaped articles, ready molding is effected.

The invention is further shown by the following examples given for illustrative purposes only and in which parts and percentages are by weight.

EXAMPLE I

Pentaerythritol was treated with propylene oxide to form a polymeric tetrol, being a polymeric propylene oxide tetrol corresponding to

wherein the value of x may or may not be the same in the various chains, the product having a hydroxyl number of 320. Six hundred parts of the polymer was treated with 1604 parts of 2,4-toluene diisocyanate at 135°C. for one hour. The isocyanato content of the product was 29.5 percent. The polymeric hydroxy compound contributes to the prepolymer to an extent of about 27 percent by weight. This prepolymer, that is, a polymer ready for foaming in place, could be stored indefinitely and shipped without difficulty. It is to be appreciated that the product of this example is a prepolymer — that is, it is a polymeric material which is further polymerizable. The prepolymers of this invention contain unchanged isocyanato groups; these are reactive to produce new polymers. For example, they are reactive with polyfunctional agents or with water and a polyfunctional agent to produce new polymers. Further, it is to be appreciated that the prepolymers of this invention are in liquid form; they are dissolved in an organic medium which is substantially a solution of the prepolymer in unchanged monomeric polyisocyanates. In this Example I, for example, the 2,4-toluene diisocyanate is used in an excess over and above that needed to react with the free hydroxyls of the polymeric-tetrol and the excess, unchanged diisocyanate acts as a solvent and also as an ingredient in the next polymerization involving also water, for example, and/or added polymeric hydroxy compounds.

A mixture of 3.5 parts of water, 58 parts of the polyetherpentaerythritol, 1.0 part of a siloxane and 0.25 part of triethylenediamine was prepared. It was mixed into 100 parts of the prepolymer and the resultant mixture was poured into a mold to form a batt. Foaming occurred as carbon dioxide evolved and the material set into a rigid, strong foam having a density of 2 lbs./cu.ft. and a compression deflection value of 38.8 lbs./sq.in. and 23.1 lbs./sq.in. in the perpendicular. No apparent shrinkage was noted after a variety of exposures.

In another example using a polymeric tetrol of the above formula but of a much higher molecular weight, a flexible foam was made.

EXAMPLE II

To a mixture comprising 27.23 percent of the polymeric polypropylene oxide-pentaerythritol prepared as in Example I and 72.77 percent of a mixture of 2,4- and 2,6-toluene diisocyanate were added 0.5 part of 2,6-di-t-butyl-4-methylphenol and 0.5 part of an emulsifying agent being a silicone product. The resultant mixture was heated for 1.5 hours at 130°C. Here again, the prepolymer is made up of about 27 percent by weight of the polymeric tetrol portion.

The product produced can be converted to a foam of the proper rigidity in several ways, as, for example, by the addition of fresh polymeric ethertetrol along with a physical blowing agent and a catalyst or by the addition of water.

To illustrate, a mixture is formed comprising 55.90 parts of the polymeric ether/pentaerythritol, 3.50 parts of water, 0.35 parts of triethylenediamine and 0.25 parts of dimethylethanolamine. Sixty parts of this mixture and 100 parts of the polymeric urethane are thoroughly mixed and poured into a mold, as, for example, a mold for the production of slabs. The reaction between the water molecules and the isocyanato groups produces carbon dioxide. As this tries to escape from the polymeric mass, the mass rises, cells are formed and a foamed product results. Foaming occurred readily and smoothly to produce a product having the following properties:

| | |
|---|---|
| Closed Cells, % | 66-68% |
| Density, lbs./cu.ft. | 1.87 |
| K Factor | 0.227 |
| Compression/Deflection, original, p.s.i. | |
| 10% | 18.4 |
| 30% | 19.5 |
| yield point | 22.0 |
| Moisture Vapor Transmission | 5-6 perm. |

EXAMPLE III

Sorbitol is converted to a polyether by reaction with propylene oxide, the product being used in this instance having a hydroxyl number of 490. A mixture contanining 20.9 percent by weight of the polyether sorbitol, 77.07 percent of toluene diisocyanate, 0.22 percent of 2,6-di-t-butyl-4-methylphenol and 1.805 percent of a silicone emulsifying agent was blended and was then heated 120°C. for 45 minutes, the viscosity thereafter being about 8000 centipoises. In this example, approximately 20 percent of the weight of the prepolymer is supplied by the polymeric-hexol made from commercially available sorbitol.

A mixture was then prepared by blending together 74.76 percent of the polypropylene ether-sorbitol, 24.27 percent of monofluorotrichloromethane, 0.243 percent of triethylenediamine, 0.486 percent N,N,N',-N'-tetramethyl-1,3-butanediamine and 0.243 percent of the phenol used in making the first product.

Equal parts of the two are then well mixed and then poured into molds for the formation of batts. Excellent foaming was attained. The rigid foam had the following properties.

| | |
|---|---|
| Closed Cells, % | 90.0 |
| Density, lbs./cu.ft. | 2.1 |
| Tensile, p.s.i. | 44.0 |
| Elongation, % | 3.8 |
| Water Absorption, 8'head for 48 hours, lbs./cu.ft. | 3.2 |
| K Factor, B.T.U./sq.ft./hr./in./°F. | 0.14 |
| Moisture vapor transmission, perms. | 6 |
| Compression/deflection, original, p.s.p. | |
| 10% | 44.2 |
| 30% | 44.0 |
| Yield Point | 43.4 |

In another experiment as described above with the sorbitol component, the physical foamant was omitted and a very high density product of low pore content was produced.

EXAMPLE IV

A mixture of equal parts of sorbitol and sugar (sucrose) was treated with propylene oxide to form a polyol of this invention. It had a hydroxyl number of 490.

A reaction component was then prepared using 68.79 percent by weight of the said sorbitol/sugar/propylene oxide adduct, 30.30 percent monofluorotrichloromethane, 0.23 percent triethylene diamine, 0.45 percent of N,N,N',N'-tetramethyl-1,3-butanediamine and 0.23 percent of a phenol.

To this component was added an equal weight of the sorbitol-isocyanato product, that is, the prepolymer, described in Example III, and after mixing well the two ingredients, the mixture was poured into a mold for the formation of batts. Excellent foaming was obtained and the fluorocarbon, as occurred previously, was trapped within the closed cells yielding a foamed product having a density of 1.8 lbs./cu.ft. and a K factor value of 0.115. In addition to these outstanding properties, it had excellent dimensional stability over a wide range of temperatures.

EXAMPLE V

A mixture of 30 percent sorbitol and 70 percent sucrose is converted to a polyether by reaction with propylene oxide, the product having a hydroxyl number of 490. A mixture having 20.9 percent by weight of the polyether sorbitol/sucrose, 77.07 percent toluene diisocyanate, 0.22 percent of 2,6-di-t-butyl-4-methylphenol and 1.805 percent of a silicone emulsifier is blended and then heated at 120°C. for 45 minutes, the viscosity being about 8,000 centipoises. About 20 percent of the prepolymer weight is made up by the polyether/sorbitol/sucrose. A mixture is then prepared by blending together 74.76 percent polypropylene ether-sorbitol/sucrose, 24.27 percent monofluorotrichloromethane, 0.243 percent triethylenediamine, 0.486 percent N,N,N',N'-tetramethyl-1,3-butanediamine and 0.243 percent of the said phenol. Equal parts of the two components are then well mixed and poured into molds to form batts. Excellent foaming was attained. The rigid foam has a closed cell content of about 90.0 percent, a density of about 2 lbs./cu.ft. and a K factor of about 0.14.

The polyether-tetrahydroxy and other polyol compounds of this invention are readily prepared from pentaerythritol or other tetrahydroxy or higher hydroxylated compounds and an alkylene or similar oxide; as is well known, the reaction between the hydroxy group and the oxide normally occurs with facility and is usually effected in a basic medium. Many of the compounds used in this invention are available commercially, as, for example, the polypropylene oxide/pentaerythritol and the polypropylene oxide/sorbitol. These produce excellent results. Like the other polyether-hydroxy compounds having at least four hydroxyls and used herein, these are polymeric and have a plurality of hydroxyl groups. The oxide adds to the four or more hydroxy groups and the addition terminates in hydroxyl groups. Thus, the hydroxyl groups are preserved for addition reactions involving the diisocyanates or other urethane formants, but the molecular weight is increased. The polyethers used in this invention may have a molecular weight as low as about 200 and as high as about 7,500 and preferably the molecular weight is between about 400 to about 6,000. On a mole basis, about 1.1 to about 130 moles of the oxide per mole of the polyol is used. The polymeric polyol component may be a mixture of the polyols of this invention, and it may contain water, for example, up to about 15 percent water, but it is preferred that the polyol component which is to be reacted to form the prepolymer contain very little or no water.

The polyether may be prepared using a mixture of oxides, as, for example, a mixture of ethylene oxide and propylene oxide. Also, there may be substitution of sulfur atoms for some of the oxygen atoms, if desired, and similarly, aryl or cycloaliphatic groups such as phenyl or cyclohexyl groups may replace some of the aliphatic carbon atoms in the ether chain. If unsaturation is desired to effect vulcanization processes, butene groups may be introduced. Normally, it is preferred to use a branched chain oxide such as

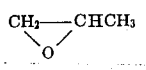

for it has been found that the resilience and compression set properties relate in part to the branching. Other oxides which can be used include di-epoxy compounds such as

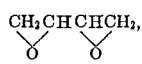

trimethylene oxide, tetramethylene oxide and pentamethylene oxide. While opening of the ring for addition by the latter two is more difficult, polyethers therefrom can be made and used in this invention. As can be seen from the above, groups other than methyl may appear as side chains, as, for example, ethyl, propyl, butyl, cyclohexyl, phenyl and other groups may be present. The nature of the oxide is important to the extent that an alkylene oxide having at least three carbon atoms should be present to an extent to give the low water adsorption and the low moisture vapor transmission properties desired. Thus, while ethylene oxide can be present, it by itself is not operable to produce the hydrophobic products of this invention. For example, conversion of 1 mole of sorbitol to a polymeric hexol using 12 moles of ethylene oxide and conversion of the adduct to a prepolymer and then further polymerizing this with a second component comprising monofluorotrichloromethane and the sorbitol/ethylene oxide adduct followed by foaming led to an open-celled structure which contained large cells and which was a very coarse, friable and hydrophilic foam. On the other hand a comparable product from sorbitol (1 mole) and propylene oxide (10 moles) gave a foam having the following properties:

| | |
|---|---|
| Density, lbs./cu.ft. | 2.15 |
| Moisture Vapor Transmission, perms | 6 to 7 |
| Tensile, psi | 44.0 |
| Closed cells, % | 91 |
| Water Absorption, 8'Head, 7 day immersion, lb./cu.ft. | 3.2 |
| Compression/Deflection Original p.s.i. | |
| 10% | 44.2 |
| 20% | 44 |
| yield point | 43.4 |

While a number of alkylene oxides have been mentioned, the mere naming is not to be taken as limitative, for there are many other oxides which may be used. To illustrate, further, butylene oxide, cyclohexene oxide, styrene oxide, octylene oxide and many others can also be used. Of the multitude, propylene oxide is preferred for the economic advantages it affords coupled with the excellent properties of the products obtained using it.

In the preparation of the polyether-hydroxy component, other hydroxy compounds having at least four hydroxyls may be used besides pentaerythritol. These include i-erythritol, the pentahydric alcohols, such as adonitol, oxylitol or arabitol, the hexahydric alcohols such as mannitol, sorbitol, aditol or dulcitol, the heptahydric alcohols such as perseitol and volemitol, glucose, fructose, and bioses and similar compounds. Other hydroxy compounds include dipentaerythritol, 2,2-dimethylol-1,-5-dihydroxypentane, and 1,3,6,9,12-pentahydroxydodecane. Reaction of these or mixtures thereof with any of the several alkylene or similar oxides leads to polymeric ether/alcohols suitable for polyurethane preparation. Based on low cost and availability the commercial mixture of sorbitol and mannitol or the commercially available sugars, such as sucrose or mixtures high in sucrose, are most frequently used in making the polyether-polyol. In every instance, the polymeric ether/alcohol becomes part of the chain in the polyurethane or polyurethane-urea and contributes to its valuable properties.

The diisocyanate used may be aliphatic or aromatic. For example, the following diisocyanates may be used: hexamethylene diisocyanate, ethylene diisocyanate, cyclohexylene-1,-2-diisocyanate, m-phenylene diisocyanate, 2,4-toluene diisocyanate, 2,6-toluene diisocyanate, 3,3'-dimethyl-4,4'-biphenylene diisocyanate, 1,5-naphthalene diisocyanate, p-phenylene diisocyanate, p,p'-methylene diphenyl diisocyanate, 3,3'-dichloro-4,4'-biphenylene diisocyanate, 4-chloro-1,3-phenylene diisocyanate, 1,5-naphthylene diisocyanate, triphenylmethane triisocyanate, tetramethylene diisocyanate, thiodipropyl diisocyanate and others. As stated above, it is frequently desirable to use mixtures of diisocyanates. A mixture of 2,4- and 2,6-toluene diisocyanate is frequently used because of its availability and relative low cost. It is preferred to use an aromatic diisocyanate and, of these, toluene diisocyanate and 3,3'-bitolylene-4,4'-diisocyanate are preferred. Such diisocyanates as these are preferred.

In addition to the branching in the polyether and restricted rotation or movement afforded by the aromatic diisocyanates, there is a definite advantage obtained in the cross-linking effects obtained from the tetra- or greater, functional nature of the polyether. The active hydrogen atoms in the polyether add readily to the isocyanato groups, and since there are at least four hydroxyl groups, cross-linking can occur. A three dimensional molecule is produced by the process of the invention in which motion is restricted to a desired degree. This leads to the products of this invention which have excellent rigidity. This characteristic permits the use of the products of this invention in many applications, as for example, in crash panels used in vehicles such as automobiles, batts, insulating materials, in filler materials, packaging materials, toys, mattresses, pillows and the like.

Thus, the objectives of this invention are accomplished by a process which comprises polymerization and cross-linking. Polymeric ether/urethanes free of ester linkages are produced. Extensive reaction times and high temperatures are not needed. Further, the properties of the products may be varied within desirable degrees by selecting the kind and the amount of the reactant. These reactants may include equivalents to those described above. For example, phosgene, a diprimary amine and the polyether-hydroxy compound may be reacted together to form the polymers of this invention. Similarly, biscarbamyl chlorides of the corresponding amines may be used or the polyether used may be modified so that it has chloro-formate groups. The amines thus may be diaromatic amines such as 2,4-toluene diamine, or aliphatic diamines such as hexamethylene diamine. Any of the reactants may be reacted to form intermediates in any desired step-wise manner or a simultaneous feeding and reaction can be effected. The selection of the reactants and their amounts will, of course, determine the amount of urethane and urea linkages appearing in the final product, but the majority of the chain extension beyond the polyether is accomplished through urethane linkages.

Normally, an anti-oxidant is used. Such stabilizers may be selected from the large number of known anti-oxidants including phenols and derivatives thereof, such as benzoquinone, hydroquinone and pyrogallol. Amines and their derivatives and certain salts having oxidizable metals or parts therein can also be used, but a goodly number of these lead to colored foamed products. Usually, a colorless product is preferred. Therefore, 2,6-di-t-butyl-4-methylphenol is generally employed. The anti-oxidant is normally added at the beginning of the process in an amount based on the weight of the prepolymer to be formed. This amount may be as low as 0.25 percent and as high as 4 percent based on said weight, but is generally 0.5 to 2 percent of the polymer weight. A foam stabilizing agent may be used and it is usually selected from the commercially available dimethyl polysiloxanes or similar siloxanes, as, for example, the phenylethoxy or propoxy siloxanes. These have a structure corresponding to

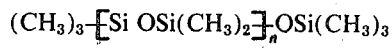

in which n may vary from 0 to 2,000. Thus, agents of varying viscosity may be used. The amount of foam stabilizer may vary from about 0.25 percent to about 2 percent based on the weight of the prepolymer, the amount being kept in the lower range for cost reasons. The foam stabilizer agent is generally added after the formation of the prepolymer. Emulsifying agents are also used, and the silicone compounds described above are usually used for this purpose also.

If desired, additives may be incorporated to impart varying properties, for example, color, to the products. Thus, dyestuffs, fillers, and even softeners may be added. Titanium dioxide, carbon black, sulfur or sulfur containing materials and the like may be added. Accelerators or cross-linking agents may be used but in the main, it is unnecessary to use anything other than the reactants, the polyether-tetrahydroxy component or the higher hydroxylated equivalents and diisocyanate component or their equivalents.

Foaming may be accomplished with other agents besides water. For example, dibasic acids, such as succinic acid, may be used. Also, the accelerators used in the foaming reaction may include methyl piperidine, tribenzylamine, pyridine, among others, being used generally in amounts of 0.5 to 3 percent based on the prepolymer weight, although lower or higher amounts may be used. Foaming is dispensed with in the event substantially nonporous products are desired. For example, the products may be air dried in the presence of catalysts such as t-amines to produce coatings. In such applications, carbon dioxide evolution occurs with but little pore formation. The coatings have excellent water and solvent resistance. They present surfaces of high gloss and their abrasion resistance is excellent. In making coatings, anhydrous conditions are preferred in order to minimize pore formation, unless, of course, porosity is desired, for example, for insulation.

The preferred products of this invention are the rigid foams. In making rigid foams polymeric polyols having molecular weights of about 200 to about 1200 will be used, the preferred range being about 400 to about 1100. For the semi-rigid and flexible foams, the molecular weights are in the higher ranges varying from about 1000 to about 7500 and depending upon the urethane forming reactant being used, the isocyanato content of the product and the like. As noted below, control leads to custom build products. Generally the polyethers used in this invention make up from about 50 percent to about 85 percent of the polymer molecular weight with the range of about 65 percent to about 80 percent being preferred, these values being in reference to the final products and not the prepolymers. In these ranges, a ready selection of the polyfunctional urethane forming reactant or reactants may be made.

The polyurethanes of this invention are highly useful polymers. They are easily and uniformly produced by reacting polyether tetrahydroxy components or equivalents thereof with reactants capable of producing urethane linkages in a polymerization reaction. The process is efficient; the products have desirable properties affording their ready use in applications where rubber cannot be used. Further, the foams of this invention have a K factor, a measure of insulation, of 0.22 or less and are usually in the neighborhood of 0.14. This shows excellent insulating properties. Still further, the products are based on polyethers which afford lower costs than polyurethanes derived from polyesters and yet better properties are attained.

This invention affords a method of controlling density and foam properties. In the reaction of the polyether hydroxy component with the urethane forming component, a product having certain characteristics is made. It is desired to control the viscosity thereof so that the product is not a solid or too fluid. While solids can be used, as by working in solvent media, and while the low molecular weight fluids may also be used, it is better to make products having viscosities between about 6000 to about 38,000 centipoises. These products can be measured by aliquot technique and by using excess isocyanate as a measure. In making flexible foams the product will have an isocyanato content of from about 8 percent to about 11 percent while in making the semi-rigid foams, the control is adjusted so that the excess —NCO content is from about 11 percent to about 22%. To get the rigid foams, the most difficult products to make in the foam field and the preferred products of this invention, control is effected to obtain an excess —NCO content of from about 22 percent to about 30 percent. As noted above, this excess isocyanate content is then utilized in getting the final product by the addition of more of the polyetherhydroxy or by adding other reactive ingredients such as water or combinations thereof. For example, with a polymer having an excess isocyanato content of 26.5 percent, water can be added to use 14 percent and the polyfunctional polyether 12.5 percent of the excess isocyanato content. This will lead to a product having a density of 2 lbs./cu.ft. If the water content is dropped to utilize only 8 percent of the excess isocyanate and the ether-alcohol is increased to utilize 18.5 percent, the resultant product has a density of 6 lbs./cu.ft.

In the controlling of density and foam properties, it is preferred to get low costs along with control. Because of their low cost, one way of getting this desirable result is through the use of the bioses — that is, the sugars or products from the sugars. While certain saccharides have been specifically mentioned above, others may be used in this invention including saccharic acid, mannose, galactose, methyl glucoside, arabinose, xylose, ribose, maltose and lactose. Of the various sugars or derivatives therefrom sucrose and sorbitol are preferred. While it is possible to use a sugar or a derivative thereof alone, frequently the solid nature and the temperature sensitivity of the sugar lead to difficulties in the preparation of the polyol which is preferred to be colorless. One convenient way of avoiding these difficulties is to use a mixture of the sugar, such as sucrose, and a liquid, thermally stable hydroxylated compound of this invention, or such a compound which is a low melting solid such as sorbitol, which acts as a carrier or solvent. By this route, excellent polyols are obtained. It is, of course, possible to use other hydroxy compounds not derived from sugar as the solvent or carrier. Of the many mixtures which are apparent, mention is made for exemplification purposes of sorbitol/pentaerythritol, hexanetriol/sucrose, glycerol/maltose, hexanetriol/lactose and glycerol/sorbitol/sucrose and glycerose/sorbitol/water/sucrose mixtures. Of the various possible mixtures, the sorbitol/sucrose mixture is preferred. In the various mixtures, one will, of course, use a maximum amount of the cheapest ingredient. Usually, about 20 percent to about 80 percent of the thermally stable hydroxy compound will be present in the mixture. While water and other compounds less hydroxylated than these of this invention, as, for example, ethylene glycol and glycerol may be added in small amounts to the mixture to be treated with the oxide, such additives are not preferred in making rigid foams, for they decrease the amount of cross-linking that can occur, and it is, by far, much better to use the highly hydroxylated compounds of this invention.

The pore content of these various products can also be controlled irrespective of whether chemical or physical blowing agents are used. With respect to the physical agents, monofluorotrichloromethane is most generally used, although other halogenated compounds may be used such as monofluorodichloromethane, chloroform, carbontetrachloride, dichloromethane, monochloromonofluoromethane, 1,1-difluoropropane, 2,2-difluoropropane, 1,1,1-trichloro-2,2-difluoropropane, dibromotetrachloroethane, dibromodifluoromethane and 2,2-difluorobutane, among others. If no water is used, the products are, in the main, polyurethanes, whereas when water is used, urea linkages are formed also so that the products are polyurethane-ureas. In any event, the cell structure is a closed cell structure and the foams rigid. The resin system has good storage stability. The reactions involve only low temperatures, and proceed smoothly. Precise control is readily effected. Production of custom-built rigidity and porosity is an outstanding advantage.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A stable, highly branched prepolymer which is a polyurethane and is in liquid form, being dissolved in a solvent comprising a reactive organic polyisocyanate, said prepolymer being capable of being placed into the form of a rigid foam which has a K factor value of less than 0.22 and which foam has a closed cell content of about 90 percent, the cells being fine, uniform cells, said prepolymer comprising the reaction product of an excess of polyisocyanate and a polymeric hydroxy compound which compound is a polyalkylene oxide being the addition product of an alkylene oxide having at least three carbon atoms with a hydroxy compound having at least six hydroxyl groups, and said prepolymer containing reactive organic polyisocyanate contributing to the presence of unchanged isocyanato groups reactive to further polymerization, the said reactive polyisocyanate acting as said solvent.

2. A composition in accordance with claim 1 in which the polymeric hydroxy compound comprises a poly(alkylene oxide) sorbitol.

3. A composition in accordance with claim 1 in which the polymeric hydroxy compound comprises a poly(propylene oxide) sorbitol.

4. A composition in accordance with claim 1 in which the polymeric hydroxy compound comprises a polyalkylene oxide derived from a biose.

5. A composition in accordance with claim 1 in which the polymeric hydroxy compound comprises a polypropylene oxide derived from a biose.

6. A composition in accordance with claim 1 in which the molecular weight of the polymeric hydroxy compound is between about 400 and about 1,200.

7. A composition in accordance with claim 1 in which said polymeric hydroxy compound contributes about 20 percent to about 27 percent of the weight of said prepolymer.

8. A prepolymer in accordance with claim 1 which is capable by further polymerization of forming a second polyurethane in which said polymeric hydroxy compound contributes about 65 percent to about 80 percent of the molecular weight of said second polyurethane.

9. A process for the formation of a stable, highly branched prepolymer which is a polyurethane and is in liquid form being dissolved in a solvent comprising a reactive organic polyisocyanate and which prepolymer in said form is capable of being further polymerized to form a high molecular weight polyurethane, which is capable of forming a rigid foam having a K factor less than 0.22, and which has a closed cell content of about 90 percent, the cells being fine, uniform cells, which process comprises mixing and reacting a polymeric hydroxy compound, being a polyalkylene oxide which is the addition product of an alkylene oxide having at least three carbon atoms with a hydroxy compound having at least six hydroxyl groups, thus being highly branched, with an organic, polyfunctional urethane-forming reactant being an organic polyisocyanate the ratio of said polymeric hydroxy compound to said reactant being such that there is an excess of urethane-forming reactant groups in the resultant prepolymer reactive to further polymerization which polymerization effects the formation of said higher molecular polyurethane in which about 65 percent to about 80 percent of the molecular weight is derived from the said highly branched polymeric hydroxy compound.

10. A process in accordance with claim 9 in which said reactant is an organic diisocyanate.

11. A process in accordance with claim 9 in which the said polymeric hydroxy compound comprises a poly(alkylene oxide) sorbitol.

12. A process in accordance with claim 9 in which the said polymeric hydroxy compound comprises a polyalkylene oxide derived from a biose.

13. A process in accordance with claim 9 in which said polymeric hydroxy compound comprises a polypropylene oxide derived from a biose.

14. A process in accordance with claim 9 in which the said urethane-forming reactant is an organic diisocyanate and there is present in the prepolymer product an excess isocyanato content of about 22 percent to about 30 percent.

15. A rigid highly cross-linked, shrink stable polyurethane foam which is made from a polymer that is a polyurethane and in which foam substantially all of the cells of the foam are closed, the closed cell content being at least 90 percent the cells being fine uniform cells, and which foam comprises the reaction product of (a) and (b) as follows: (a) an arylene polyisocyanate at least a part of which is a polyurethane in prepolymer form which prepolymer is derived from a polymeric hydroxy compound that is the addition product of an alkylene oxide that has at least three carbon atoms and a polyol having at least six hydroxy groups and (b) a polymeric polyoxyalkylene ether which is the addition product of an alkylene oxide having at least three carbon atoms with a highly branched polyol having at least six hydroxy groups, said foam having a K factor value of less than 0.22, said foam being formed using a volatile, halogenated, lower alkane containing chlorine and fluorine atoms as the sole blowing agent, thereby obtaining the said K factor of less than 0.22.

16. A rigid foam in accordance with claim 15 in which said polyol comprises a hexitol.

17. A rigid foam in accordance with claim 16 in which said hexitol comprises sorbitol.

18. A rigid foam in accordance with claim 15 in which said polyol comprises a polyol derived from a biose.

19. A rigid foam in accordance with claim 15 which contains therein a said blowing agent.

20. A rigid foam in accordance with claim 15 in which said blowing agent consists of monofluorotrichloromethane.

21. A liquid composition of matter comprising a mixture which comprises a blowing agent which consists of a volatile halogenated lower alkane containing chlorine and fluorine atoms admixed with a highly branched polyurethane which is reactive and which comprises the reaction product of an organic polyfunctional urethane-forming reactant being an organic polyisocyanate and a polymeric polyoxyalkylene ether which is the addition product of an alkylene oxide having at least three carbon atoms with a highly branched polyol having at least six hydroxyl groups, said reactive polyurethane being reactive to form a second but solid polyurethane which contains therein said halogenated alkane, said solid polyurethane being in the form of a rigid foam which has a K factor value of less than 0.22 and which foam has a closed cell content of about 90 percent, the cells being fine, uniform cells.

22. A composition of matter in accordance with claim 21 in which said polyol comprises sorbitol.

23. A composition of matter in accordance with claim 21 in which said polyol is derived from a biose.

24. A composition of matter in accordance with claim 21 in which said alkane consists of monofluorotrichloromethane.

25. A composition of matter in accordance with claim 21 in which said polyisocyanate comprises a diisocyanate.

* * * * *

UNITED STATES PATENT OFFICE
CERTIFICATE OF CORRECTION

Patent No. 3,846,347                Dated November 5, 1974

Inventor(s) Kenneth P. Satterly

It is certified that error appears in the above-identified patent and that said Letters Patent are hereby corrected as shown below:

On the Cover Sheet, item [73] should read as follows:

-- Assignee   Witco Chemical Corporation --.

In the Abstract, line 19 thereof, "iscoyanato" should read -- isocyanato --.

Column 4, line 25, "p.s.p." should read -- p.s.i. --.

Column 8, line 56, "build" should be -- built --.

Signed and Sealed this fourth Day of May 1976

[SEAL]

Attest:

RUTH C. MASON
Attesting Officer

C. MARSHALL DANN
Commissioner of Patents and Trademarks